(12) United States Patent
Shinar et al.

(10) Patent No.: US 11,824,678 B2
(45) Date of Patent: Nov. 21, 2023

(54) DEVICE, SYSTEM, AND METHOD OF DYNAMICALLY CONFIGURING A SUB-1 GIGAHERTZ RECEPTION MODULE VIA A WI-FI COMMUNICATION LINK

(71) Applicant: OLIBRA LLC, Cresskill, NJ (US)

(72) Inventors: Zohar Shinar, Demarest, NJ (US); Christopher Andrew Merck, Sussex, NJ (US); Marcio Granzotto Rodrigues, Florianopolis (BR)

(73) Assignee: OLIBRA LLC, Cresskill, NJ (US)

( * ) Notice: Subject to any disclaimer, the term of this patent is extended or adjusted under 35 U.S.C. 154(b) by 729 days.

(21) Appl. No.: 17/008,718

(22) Filed: Sep. 1, 2020

(65) Prior Publication Data

US 2020/0396098 A1     Dec. 17, 2020

Related U.S. Application Data

(63) Continuation-in-part of application No. 16/901,014, filed on Jun. 15, 2020, now Pat. No. 11,133,954, and
(Continued)

(51) Int. Cl.
*H04L 12/28* (2006.01)
*G08C 17/02* (2006.01)
(Continued)

(52) U.S. Cl.
CPC ............ *H04L 12/282* (2013.01); *G08C 17/02* (2013.01); *G08C 23/04* (2013.01);
(Continued)

(58) Field of Classification Search
CPC ............... H04L 12/282; H04L 12/2832; H04L 12/2834; H04L 12/2838; H04L 61/5038;
(Continued)

(56) References Cited

U.S. PATENT DOCUMENTS

| | | | | |
|---|---|---|---|---|
| 5,187,472 A | * | 2/1993 | Hart ....................... | G08C 17/02 340/584 |
| 6,120,262 A | * | 9/2000 | McDonough .......... | H05B 47/19 318/16 |

(Continued)

*Primary Examiner* — Kerri L McNally
*Assistant Examiner* — Thang D Tran
(74) *Attorney, Agent, or Firm* — AlphaPatent Associates Ltd.; Daniel J. Swirsky (57) ABSTRACT

Device, system, and method of dynamically configuring a Sub-1 Gigahertz reception module via a Wi-Fi communication link. For example, a ceiling fan includes rotatable blades, an electric motor to rotate them, and a fan controller to control activation and deactivation and rotation speed of the electric motor. The ceiling fan further includes a non-Wi-Fi wireless receiver unit, such as a Sub-1 Gigahertz wireless receiver unit, to receive incoming non-Wi-Fi signals indicating control commands to the ceiling fan which is associated with an existing Fan Address Code. The ceiling fan also includes a Wi-Fi wireless receiver unit, to receive an incoming Wi-Fi message indicating a replacement Fan Address Code. The ceiling fan includes a Fan Address Code Modification Unit, to replace (i) the existing Fan Access Code of the ceiling fan, with (ii) a replacement Fan Access Code that was received via the incoming Wi-Fi message.

20 Claims, 1 Drawing Sheet

Related U.S. Application Data a continuation-in-part of application No. 16/894,904, filed on Jun. 8, 2020, now Pat. No. 10,872,481, and a continuation-in-part of application No. 16/868,574, filed on May 7, 2020, now Pat. No. 10,848,336, said application No. 16/894,904 is a continuation of application No. 16/720,134, filed on Dec. 19, 2019, now Pat. No. 10,685,517, said application No. 16/901,014 is a continuation of application No. 16/571,198, filed on Sep. 16, 2019, now Pat. No. 10,721,089, and a continuation-in-part of application No. 16/517,604, filed on Jul. 21, 2019, now Pat. No. 10,952,016, and a continuation-in-part of application No. 16/416,220, filed on May 19, 2019, now Pat. No. 10,883,509, and a continuation-in-part of application No. 16/411,164, filed on May 14, 2019, now Pat. No. 11,313,173, said application No. 16/868,574 is a continuation-in-part of application No. 16/214,079, filed on Dec. 9, 2018, now Pat. No. 10,673,646, said application No. 16/517,604 is a continuation-in-part of application No. 16/001,958, filed on Jun. 7, 2018, now Pat. No. 10,553,057, said application No. 16/720,134 is a continuation of application No. 16/001,958, filed on Jun. 7, 2018, now Pat. No. 10,553,057, said application No. 16/571,198 is a continuation of application No. 15/853,796, filed on Dec. 24, 2017, now Pat. No. 10,454,703, which is a continuation-in-part of application No. 15/347,162, filed on Nov. 9, 2016, now Pat. No. 9,860,360.

(60) Provisional application No. 62/517,919, filed on Jun. 11, 2017, provisional application No. 62/339,793, filed on May 20, 2016, provisional application No. 62/256,677, filed on Nov. 17, 2015.

(51) Int. Cl.
*G08C 23/04* (2006.01)
*H04M 1/72415* (2021.01)
*H04W 4/33* (2018.01)
*H04L 67/12* (2022.01)
*H04L 61/5038* (2022.01)

(52) U.S. Cl.
CPC ...... *H04L 12/2832* (2013.01); *H04L 12/2834* (2013.01); *H04L 12/2838* (2013.01); *H04M 1/72415* (2021.01); *G08C 2201/20* (2013.01); *G08C 2201/40* (2013.01); *H04L 61/5038* (2022.05); *H04L 67/12* (2013.01); *H04L 2012/2841* (2013.01); *H04W 4/33* (2018.02)

(58) Field of Classification Search
CPC ............ H04L 67/12; H04L 2012/2841; H04M 1/72415; G08C 1/02; G08C 2201/20; G08C 2201/40; H04W 4/33
USPC ........................................................ 455/557
See application file for complete search history.

(56) References Cited

U.S. PATENT DOCUMENTS

| | | | | |
|---|---|---|---|---|
| 6,771,182 | B1* | 8/2004 | Loh | G08C 23/04 340/5.23 |
| 7,196,485 | B1* | 3/2007 | Lee | F24F 7/007 318/400.38 |
| 8,552,842 | B2* | 10/2013 | Naval | H05B 47/19 362/85 |
| 2003/0075351 | A1* | 4/2003 | Chang | H01H 13/70 174/491 |
| 2008/0088270 | A1* | 4/2008 | Hsu | F04D 25/088 318/490 |
| 2010/0314941 | A1* | 12/2010 | Schulzman | F04D 25/068 307/40 |
| 2012/0218114 | A1* | 8/2012 | Davis | G01R 19/2513 340/646 |
| 2013/0201316 | A1* | 8/2013 | Binder | H04L 67/12 701/2 |
| 2013/0272147 | A1* | 10/2013 | Vermani | H04B 7/0689 370/252 |
| 2013/0315262 | A1* | 11/2013 | Baik | H04L 5/0046 370/474 |
| 2014/0074257 | A1* | 3/2014 | Bhargava | H04L 12/282 700/47 |
| 2014/0163751 | A1* | 6/2014 | Davis | G08C 17/02 700/286 |
| 2015/0200788 | A1* | 7/2015 | Thomas | H04B 10/116 455/420 |
| 2015/0223047 | A1* | 8/2015 | Abraham | H04W 52/0216 370/328 |
| 2015/0325112 | A1* | 11/2015 | McPherson | H04W 4/00 455/419 |
| 2016/0026201 | A1* | 1/2016 | Vellanki | G05F 1/66 700/297 |
| 2016/0075016 | A1* | 3/2016 | Laurent | G05B 15/02 700/47 |
| 2016/0075034 | A1* | 3/2016 | Laurent | G05B 15/02 700/264 |
| 2017/0017450 | A1* | 1/2017 | Bostick | G06F 3/0481 |
| 2018/0220506 | A1* | 8/2018 | Sadwick | H05B 47/18 |

* cited by examiner

DEVICE, SYSTEM, AND METHOD OF DYNAMICALLY CONFIGURING A SUB-1 GIGAHERTZ RECEPTION MODULE VIA A WI-FI COMMUNICATION LINK

CROSS-REFERENCE TO RELATED APPLICATIONS

This patent application is a Continuation-in-Part (CIP) of U.S. Ser. No. 16/901,014, filed on Jun. 15, 2020, which is hereby incorporated by reference in its entirety.

The above-mentioned U.S. Ser. No. 16/901,014 is a Continuation of U.S. Ser. No. 16/571,198, filed on Sep. 16, 2019, now patent number U.S. Pat. No. 10,721,089 (issued on Jul. 21, 2020), which is hereby incorporated by reference in its entirety; which is a Continuation of U.S. Ser. No. 15/853,796, filed on Dec. 24, 2017, now patent number U.S. Pat. No. 10,454,703 (issued on Oct. 22, 2019), which is hereby incorporated by reference in its entirety.

The above-mentioned U.S. Ser. No. 15/853,796 is a Continuation-In-Part (CIP) of U.S. Ser. No. 15/347,162, filed on Nov. 9, 2016, now patent number U.S. Pat. No. 9,860,360 (issued on Jan. 2, 2018), which is hereby incorporated by reference in its entirety.

The above-mentioned U.S. Ser. No. 15/347,162 claims priority and benefit from U.S. 62/256,677, filed on Nov. 17, 2015, which is hereby incorporated by reference in its entirety.

The above-mentioned U.S. Ser. No. 15/347,162 also claims priority and benefit from U.S. 62/339,793, filed on May 20, 2016, which is hereby incorporated by reference in its entirety.

This patent application is a Continuation-in-Part (CIP) of U.S. Ser. No. 16/868,574, filed on May 7, 2020, which is hereby incorporated by reference in its entirety; which is a Continuation-in-Part (CIP) of U.S. Ser. No. 16/214,079, filed on Dec. 9, 2018, now patent number U.S. Pat. No. 10,673,646 (issued on Jun. 2, 2020), which is hereby incorporated by reference in its entirety.

This patent application is a Continuation-in-Part (CIP) of U.S. Ser. No. 16/411,164, filed on May 14, 2019, which is hereby incorporated by reference in its entirety.

This patent application is a Continuation-in-Part (CIP) of U.S. Ser. No. 16/416,220, filed on May 19, 2019, which is hereby incorporated by reference in its entirety.

This patent application is a Continuation-in-Part (CIP) of U.S. Ser. No. 16/517,604, filed Jul. 21, 2019, which is hereby incorporated by reference in its entirety.

The above-mentioned U.S. Ser. No. 16/517,604 is a Continuation-in-Part (CIP) of U.S. Ser. No. 16/001,958, filed on Jun. 7, 2018, now patent number U.S. Pat. No. 10,553,057 (issued on Feb. 4, 2020), which is hereby incorporated by reference in its entirety; which claims benefit and priority from U.S. 62/517,919, filed on Jun. 11, 2017, which is hereby incorporated by reference in its entirety.

This patent application is a Continuation-in-Part (CIP) of U.S. Ser. No. 16/894,904, filed on Jun. 8, 2020, which is hereby incorporated by reference in its entirety.

The above-mentioned U.S. Ser. No. 16/894,904 is a Continuation of U.S. Ser. No. 16/720,134, filed on Dec. 19, 2019, now patent number U.S. Pat. No. 10,685,517 (issued on Jun. 16, 2020), which is hereby incorporated by reference in its entirety; which is a Continuation of U.S. Ser. No. 16/001,958, filed on Jun. 7, 2018, now patent number U.S. Pat. No. 10,553,057 (issued on Feb. 4, 2020), which is hereby incorporated by reference in its entirety; which claims benefit and priority from U.S. 62/517,919, filed on Jun. 11, 2017, which is hereby incorporated by reference in its entirety.

FIELD

The present invention is related to the field of electronic devices and home appliances.

BACKGROUND

Millions of people around the world utilize mobile electronic devices, such as smartphones and tablets, in order to perform various activities. Such activities include, for example, browsing the Internet, sending and receiving electronic mail (email) messages, taking photographs and videos, engaging in a video conference, playing games, or the like.

Millions of households include various appliances and electric devices, for example, a fridge, a freezer, a microwave oven, a ceiling fan, an air conditioning unit, or the like. Such devices and their operational features are typically controlled via manual pressing of keys or buttons that are located on the appliance, for example, a numeric keypad of a microwave oven, or a physical rotating button that allows a user to modify the temperature settings of a fridge.

SUMMARY

Embodiments of the present invention comprise devices, systems, and methods of wirelessly controlling and/or dynamically configuring various appliances and electric devices, particularly via a smartphone or tablet. For example, a Wi-Fi communication link is utilized in order to read, write, modify, replace and/or update a unique appliance address or a unique appliance identifier, that is stored within the appliance, and which is utilized for pairing between (i) a wireless receiver or a Radio Frequency (RF) receiver or a Sub-1 Gigahertz receiver or a non-Wi-Fi wireless receiver of the appliance, and (ii) a wireless transmitter or a Radio Frequency (RF) transmitter or a Sub-1 Gigahertz transmitter or a non-Wi-Fi wireless transmitter that is external to the appliance and which is capable of communicating with that particular appliance.

In some embodiments, a ceiling fan comprises: (a) rotatable blades; (b) an electric motor to rotate said rotatable blades; (c) a fan controller, to control activation and deactivation and rotation speed of said electric motor; (d) a non-Wi-Fi wireless receiver unit, to receive incoming non-Wi-Fi signals indicating control commands to said ceiling fan which is associated with an existing Fan Address Code; (e) a Wi-Fi wireless receiver unit, to receive an incoming Wi-Fi message indicating a replacement Fan Address Code; (f) a Fan Address Code Modification Unit, to replace (I) said existing Fan Access Code of said ceiling fan, with (II) said replacement Fan Access Code that was received via said incoming Wi-Fi message.

Some embodiments may provide other and/or additional benefits and/or advantages.

DESCRIPTION OF SOME DEMONSTRATIVE EMBODIMENTS

For demonstrative purposes, some portions of the discussion herein may relate to controlling and/or configuring and/or operating of a Ceiling Fan; however, this is only a non-limiting example, and some embodiments of the present invention may be utilized for configuring and/or or controlling and/or operating (and/or wirelessly communicating with) other types of devices or appliances; for example: a desk fan; a floor/standing fan; a window fan; an air conditioning unit or system; a heating unit or system; a cooling system or unit; a Heating Ventilation and Air Conditioning (HVAC) system or unit; a garage door, or a garage door opener, or a garage door unit or system; a gas-based or propane-based or electric-based fire-place; a light-bulb; a light fixture, lamp, chandelier, or other illumination units; a kitchen appliance (e.g., oven, microwave, range, fridge, freezer, dishwasher); a hot tub or a spa system or a Jacuzzi unit or system; an indoor or an outdoor swimming pool; a heating unit of a swimming pool or of a hot tub; a system that produces or that modifies one or more features of a swimming pool or of a hot tub (e.g., water temperature, heating level, salt level, chlorine level); a system that controls one or more features of a bathtub or a shower or a bathroom system; an electric shades system or electric blinds system or electric window cover system; or the like. In such appliances or devices or systems, the present invention may similarly be used, with the relevant changes; for example, instead of referring to a "Fan Address", the discussion may be read as referring to an "Appliance Address" or to a "Garage Door Opener Address"; or, instead of referring to a "Fan Controller", the discussion may be read as referring to an "Appliance Controller" or to an "HVAC System Controller", and so forth.

The term "Wi-Fi" as used herein includes one or more wireless communication protocols that are based on the IEEE 802.11 family of standards, which are used for Wireless Local Area Networking (W-LAN) among devices and/or for enabling Internet access to devices. "Wi-Fi" as used herein may include, for example, wireless communication links and/or networks and/or signals and/or protocols in accordance with one or more of the following: 802.11-1997, 802.11 Legacy, 802.11a, 802.11b, 802.11g, 802.11-2007, 802.11n, 802.11-2012, 802.11ac, 802.11ad, 802.11af, 802.11-2016, 802.11ah, 80211ai, 802.11aj, 802.11aq, 802.11ax, 802.11ay, 802.11be, and/or other, current and/or future versions or amendments or enhancements of any of said protocols.

The term "Non-Wi-Fi" as used herein includes one or more wireless communication schemes or protocols or standards or methods or systems, which enable electro-magnetic transfer of information between two or more points that are not connected by an electric conductor or cable or wire, particular over radio wave or over Radio Frequency (RF) waves; other than Wi-Fi, or excluding Wi-Fi, or except for Wi-Fi. For example, "Non-Wi-Fi" wireless communications, as used herein, may include: Sub-1 Gigahertz communication, Low-Power Wide-Area Network (LP-WAN or LPWAN) communication, Low-Power Network (LPN) communication, Ultra Narrowband (UNB) modulation communication, Low-Rate Wireless Personal Area Network (LR-WPAN) communication, Zigbee communication, IEEE 802.15.4 communication, non-Wi-Fi wireless communication protocols utilized by home appliances and/or by Internet of Things (IoT) devices, wireless communications at a frequency of 315 MHz, wireless communication at a frequency of 433 MHz, wireless communication at a frequency of 468 MHz, wireless communications at a frequency of 780 MHz, wireless communications at a frequency of 868 MHz, wireless communications at a frequency of 915 MHz, wireless communications at a frequency of 950 MHz, wireless communication at a frequency in the range of 769 to 935 MHz (including these two values), wireless communication at a frequency in the range of 868.0 to 868.6 MHz (including these two values), wireless communication at a frequency in the range of 902 to 928 MHz (including these two values), wireless communication at a frequency in the range of 314 to 316 MHz (including these two values), wireless communication at a frequency in the range of 430 to 434 MHz (including these two values), wireless communication at a frequency in the range of 779 to 787 MHz (including these two values), wireless communication at a frequency in the range of 950 to 956 MHz (including these two values), wireless communication at a frequency in the range of 301 to 999 MHz (including these two values), wireless communication at a frequency that is smaller than 1 Gigahertz, wireless communication at a frequency or a frequency band typically reserved for Industrial, Scientific and Medical (ISM) purposes and that is smaller than 1 Gigahertz, wireless communication at a frequency in the range of 6.765 to 6.795 MHz (including these two values), wireless communication at a frequency in the range of 13.553 to 13.567 MHz (including these two values), wireless communication at a frequency in the range of 26.957 to 27.283 MHz (including these two values), wireless communication at a frequency in the range of 40.66 to 40.70 MHz (including these two values), wireless communication at a frequency in the range of 433.05 to 434.79 MHz (including these two values).

The terms "Sub-1 Gigahertz" or "Sub-1 GHz" as used herein include any one or some of the communication protocols or methods or schemes that are mentioned above as Non-Wi-Fi and that are also at a frequency that is less than 1 Gigahertz.

The present invention may provide the capability for wireless, remote, application-based or "app" based, and/or dynamic managing, operating controlling and/or configuring, of a Ceiling Fan or other appliance or controlled-device; and particularly, of such remote or wireless control of a Learning Process or a Pairing Process or a Training Process between such ceiling fan (or other appliance) and a wireless remote control unit for such ceiling fan (or other appliance).

The present invention may allow users of ceiling fans or smart ceiling fans, or Internet-connected ceiling fans, an Internet Protocol (IP) connected ceiling fan, to enjoy the benefits of auto-learning or auto-pairing, while still being able to install multiple ceiling fans on (or within, or being associated with) a single electric circuit and/or a single toggle switch and/or a single room or residence or venue. Additionally or alternatively, a user or owner or administrator of multiple ceiling fans, each one associated with its own multiple remote control unit, may be able to see and to selectively manage (e.g., configure, modify) the operational properties or the configurational properties of such ceiling fans and/or their remote control units, via a visual app-based interface or other dashboard or on-screen management panel.

In accordance with the present invention, a Ceiling Fan wireless control architecture includes two components: an RF receiver or a wireless receiver that is located at or in or within the ceiling fan; and an RF transmitter or a wireless transmitter that is located in a remote and/or portable remote control unit. The transmitter and receiver operate on (or at) the same carrier frequency, and use a compatible protocol.

Furthermore, the transmitter has or utilizes a numeric code, which may be referred to as "address" or "fan address" or "fan identifier" or "fan unique identifier", which is expected by the receiver. The use of such addresses allows multiple ceiling fans to be used in the same venue, and/or within RF range of each other, without undesired cross-control or interference or clash; and prevent a situation in which User Adam pushes a button in a remote control unit, expecting to control Ceiling Fan 1 in Room 1, but the remote control unit actually (or additionally) controls Ceiling Fan 2 in Room 2, or controls Ceiling Fan 3 located in a neighboring apartment of User Bob. The process of establishing agreement between receiver and transmitter as to the unique address may be called "pairing" or "learning" or "training" or "hand-shaking".

Embodiments of the present invention may be utilized in conjunction with, and/or may improve or may enhance, one or more types of pairing technologies or pairing systems; including, for example, traditional Dual In-Line Package (DIP) switch based pairing; auto-learning DIP-switch based pairing; auto-learning random/pseudo-random pairing; multiple-address auto-learning random/pseudo-random pairing.

Some embodiments of the present invention may be utilized in conjunction with a Traditional DIP-switch based pairing system. For example, one or more mechanical switches or movable levers or movable buttons or movable physical switches or movable DIP switches or manually toggle-able physical switches or physical buttons, are utilized at both the transmitter and receiver. Each such physical switch represents one binary bit of the Fan Address, and the set of values of the switches must match exactly on the transmitter and receiver in order for pairing to occur and to enable the transmitter to remotely control this specific ceiling fan that is equipped with this specific receiver. The DIP-switches approach may provide benefits, for example: (a) It is easy to configure by a human installer, sometimes even without reading an instructions manual; (b) The pairing process is out-of-band (e.g., it does not take place over RF), and thus the pairing process itself does not typically suffer from interfering with the pairing of previously installed fans while setting up a new fan.

However, the Applicants have realized that a conventional DIP-switch based pairing process may involve disadvantages, for example: (a) Cost: the DIP switches in the receiver (and in the transmitter) have an associated cost; (b) Form Factor: the including of physical DIP switches may require to increase the size or dimensions or form factor of the transmitter and/or the receiver, and/or their housing; and/or may require to modify the architecture or the physical structure of such devices in order to allow manual access of a human to those DIP switches. (c) Limited number of addresses: practical cost and size constraints often limit the number of unique addresses; often there are only 4 to 8 such DIP switches, which allow for only 16 to 256 unique addresses, which may be insufficient in a single large venue or in a set of neighboring venues (e.g., a factory or a commercial facility having dozens of ceiling fans; an apartment building having dozens or hundreds of apartments; or the like). (d) High chance of interference: in a suburban or urban area, neighbors may be using the same model of ceiling fans with the same choice of address; such as, two or more neighbors may select the same address of "1111" or "00110011" which is easier to set; the small number of addresses, and/or the practical need for a default address setting on the remote control units, may lead to frequent interference between ceiling fans of neighboring venues. (e) Difficulty and safety issue with modification: If a mistake is made in the pairing process, the human installer typically needs to obtain, and to climb on, a ladder to access the receiver's DIP switches in order to manually and physically change them; working on a ladder near a ceiling fan and possibly next to a "live" electrical box, is dangerous and/or risky. (f) Hidden information: There is not efficient way to tell what is the current value of a ceiling fan receiver's set of DIP switches, without obtaining and climbing a ladder and manually checking with eyesight.

Some embodiments of the present invention may be used in conjunction with an auto-learning DIP-switch based pairing system. For example, the receiver at the ceiling fan does not include DIP switches; whereas the transmitter at the remote control unit does include a set of DIP switches. The receiver of the ceiling fan listens to, or waits for, or wirelessly receives from the transmitter, a pre-defined pairing signal, during a time-constrained learn window or learning window or training window or pairing window (e.g., 30 or 60 seconds) which commences once electrical power is newly applied to the receiver of the ceiling fan. The pairing signal is generated at the remote control unit, by holding down a button (e.g., a power button or a start/stop button button) for a pre-defined period of time (e.g., for 3 seconds), or by tapping a learn/set/pair button on the remote control unit. Upon receiving the pairing signal within the time-constrained pairing window or learning window, the receiver of the ceiling fan overwrites and replaces a previous value of Fan Address that it had in its local storage or memory, with a new value of Fan Address that was received in the pairing message.

This approach may have benefits, for example: (a) It may reduce the cost and/or the form factor of the receiver and/or of the ceiling fan, by removing DIP switches from them; (b) Increased safety, as there is no longer a need to climb on a ladder in order to check or modify DIP switch values of a ceiling fan (e.g., assuming that there is only one ceiling fan per electric circuit, and an accessible DIP switch or circuit breaker).

However, the Applicants have realized that the auto-learning DIP switch approach may still maintain some of the previously-discussed disadvantages (e.g., limited number of addresses; high chance of interference); and also introduces additional disadvantages: (a) A major problem occurs if multiple ceiling fans are installed on one common electrical circuit (e.g., share the same circuit breaker/branch circuit, without separate "dumb" switches); in such situation, attempting to re-pair any of the ceiling fans via auto-learning may result in over-writing (or resetting) of all the Fan Addresses of all the ceiling fans in that same electric circuit; each ceiling fan would require its own "dumb" switch so that their power can be independently toggled, which in turn may add to cost and complexity of installation, and may be non-desired by the user or owner of the venue. (b) In this architecture, the Fan Address information is actually more hidden than before; as the only way to check what Fan Address a particular receiver of a particular ceiling fan has, is by testing with a remote control transmitter; and even climbing a ladder and visual inspection of the ceiling fan cannot assist here. (c) This architecture may introduce a new type of interference, e.g., pairing interference; if the power cycles in an entire building or venue, ceiling fans may get accidentally re-paired by neighbors who happen to perform the pairing signal within the same learning window (e.g., 60 seconds long).

Some embodiments of the present invention may operate in conjunction with an auto-learning random or pseudo-random pairing process. For example, in order to reduce cost and/or to increase the number of available addresses, a manufacturer may assign a random or pseudo-random Fan Address to every ceiling fan/transmitter that is manufactured and sold. This may be, for example, a 16-bit address; such that 65,536 addresses are available. The addresses may be assigned sequentially at the manufacturing factory (e.g., they roll over every 65,536 ceiling fans that are manufactured), or are assigned based on a random number generator (RNG) or a pseudo-random number generator (PRNG). Optionally, a transmit of the remote control unit may further comprise a private-public address switch, to allow switching between the factory-assigned private Fan Address (the random address), and a public address (usually address Zero).

This approach may have advantages, such as: (a) reduced cost, by elimination of transmitter-side DIP switches; (b) reduction of the limited address problem, by using a large pool of possible addresses, thereby allowing utilization of dozens or even hundreds of ceiling fans at a commercial-scale project or venue without clashes.

However, the Applicants have realized that this architecture lacks any three-way support: it is not possible to use multiple remote control transmitter units in order to control the same receiver of a single ceiling fan, such as, a first hand-held remote control unit and a second wall-mounted remote control unit, or several of each type of remote control unit (e.g., located at opposites sides or entrances of the same room or venue). With the DIP switch based architectures described above, it may be possible to set all transmitters of all remote control units to the same Fan Address. However, with the random factory-assigned Fan Addresses, these addresses cannot be changed by a human user, installer or owner. The public-private switch may not help either, because using the public address would only work for one ceiling fan before interference occurs.

Some embodiments of the present invention may operate in conjunction with a Multiple-Address Auto-Learning random/pseudo-random pairing architecture. For example, in order to mitigate the above-mentioned disadvantage of the factory-assigned random addresses architecture, a ceiling fan may include a receiver which may support the addition of several (e.g., five or ten) different Fan Addresses; such that instead of pre-storing only one Fan Address in each ceiling fan's receiver, a list or lookup table or ring buffer or cyclic buffer of multiple such pre-assigned Fan Addresses is stored at the ceiling fan's receiver side. If one of those Fan addresses is over-written, then a pointer is advanced or moved to the next-available address in the buffer or list. A subsequent pairing or re-pairing process would cause that next address to be over-written. The receiver will honor an incoming command that mentions any of the Fan Addresses that are stored in the buffer or list on its side.

The Applicants have realized that this approach, which may mitigate the three-way support problem, may introduce other disadvantages: (a) It may increase the Hidden Information problem; as a customer or user would frequently be surprised, e.g., when she tries to swap the pairing of two remote control transmitters, but they end up with both remote control transmitters becoming paired to both ceiling fans receivers, and will need to find out how to clear the memory of these two receivers. (b) Need for procedure to clear memory of the receivers: In order to remove all other transmitters from the memory, it would be necessary to pair a remote control transmitter N times in a row with the same ceiling fan receiver, wherein N is the size of ring buffer or the cyclic buffer (e.g., 5 or 10 or other values); this may be cumbersome, time-consuming, error-prone, should be documented in product literature or instructions manual; and it is also difficult for some users to understand, or it is forgotten or misunderstood by even by professional installers and support specialists.

Some embodiments of the present invention may also be used with other types of pairing mechanisms for a ceiling fan; such as, using Bluetooth or Bluetooth Low Energy (BLE) for the pairing process between remote control transmitter(s) and a receiver of a ceiling fan. However, the Applicants have realized that Bluetooth or BLE may suffer from range limitations, may have higher latency, may require higher cost, and may be less common in the ceiling fan industry. Furthermore, a Bluetooth based architecture may break backwards compatibility with existing transmitter models that some manufacturers are already using, and which salespeople and installers already understand, and which users may already possess.

In accordance with some embodiments of the present invention, an IEEE 802.11 (Wi-Fi) transceiver, or Wi-Fi receiver, or Wi-Fi transmitter, or Wi-Fi transmitter-receiver, or a Wi-Fi module, is added into the ceiling fan (or other controlled appliance). The added Wi-Fi Transceiver within the ceiling fan, enables dynamic configuration and/or setting and/or replacement and/or updating and/or writing and/or over-writing and/or reading of one or more values or parameters or operational properties or configurational properties (e.g., one or more Fan Address values that are stored internally within the ceiling fan) that may be utilized by another, non-Wi-Fi, receiver (or transceiver) of the ceiling fan; such as a Sub-1 Gigahertz receiver of the ceiling fan, which is in Sub-1 Gigahertz communication with a Remote Control unit of that ceiling fan. The Wi-Fi transceiver is added to the ceiling fan, such as between (i) the Sub-1 Gigahertz receiver that listens to incoming Sub-1 Gigahertz commands from a Sub-1 Gigahertz remote control unit, and (ii) the ceiling fan's (or the appliance's) electronic components and/or electro-mechanical components (e.g., motor, rotor, light, electric circuit, or controller(s) thereof). The system of the present invention includes a user-controlled software or interface, which enables that Wi-Fi module to dynamically configure or modify the properties or parameters utilized by the relevant type of address pairing architecture of that ceiling fan, and further enables remote and dynamic and selective reading, writing, modification, resetting, deletion, replacement and/or over-writing of already-stored or previously-stored or factory-assigned or user-defined Fan Addresses (or Appliance Addresses) via an "app" or application or via an Internet-based or browser-based dashboard or website or web-page or interface; and optionally providing an Application Programming Interface (API) which is used by a mobile application (e.g., on a smartphone or smart-watch or tablet) and/or customer service dashboard with Graphical User Interfaces (GUIs). It is noted that other architectures may be used in accordance with the present invention; for example, in some embodiments, optionally, the decoding and filtering of incoming Fan Address value(s) may be performed by the firmware of the Wi-Fi transceiver unit. It is also noted that in some embodiments, there may be other ways or locations or places in which the Wi-Fi transceiver or unit may be added; such as, the incoming remote control signal may be decoded by a separate micro-controller (e.g., the factory motor controller), and in such case, the Fan Address Value(s) list would be shared with the factory controller.

From the Physical (Firmware) aspect, the system may support one or more of the foregoing list of types of address pairing technologies, based on the particular preferences or implementations of a particular ceiling fan manufacturer, yet embodiments of the present invention may enhance or improve any one of those address pairing technologies and/or may solve or mitigate or prevent one or some or all of the associated problems.

For example, systems of the present invention that utilize a DIP switch based configuration of Fan Address, may improve or enhance Safety and Convenience by allowing the end-user to re-open the pairing window or the learning window via the API and/or via the mobile app (e.g., optionally using an in-app guided process or a step-by-step "wizard" process). Therefore, the user can change the Fan Address utilized by the receiver of the ceiling fan, via his smartphone or tablet or computer, without obtaining or climbing a ladder. In some implementations, a user that does obtain and climb a ladder, may notice that the values of the DIP switches of the receiver of the ceiling fan no longer reflect the actual Fan Address value that is stored in memory in the ceiling fan and that is actually utilized by the ceiling fan; however, the user can easily see, visually in the app or dashboard or computerized control panel, the actual current value of the Fan Address that is utilized by each ceiling fan. In some embodiments, the user can reset via the app to the physical DIP switch settings, or the user can change the DIP switch settings on the receiver and that value will take effect. In some embodiments, optionally, an Override Module may operate to ensure that the Fan Address value that is configured remotely via the Wi-Fi communication link, over-rides and governs over a physical DIP-switch based Fan Address in the receiver of the ceiling fan; thereby obviating any need to obtain or climb a ladder.

In some systems of the present invention that utilize a DIP switch based pairing architecture, the system may optionally allow the addition of extra Fan Addresses to a ceiling fan; thereby converting or upgrading or modifying a traditional DIP-switch only ceiling fan into a Hybrid multiple-address+ Traditional DIP switch configuration. This may be useful when some remote control transmitters are installed or mounted on wall where it is difficult to manually access their physical DIP switches, and a consumer wants to add a new remote control unit to control that ceiling fan.

Some embodiments of the present invention, which operate with an auto-learning pairing architecture, may solve or prevent or mitigate the problem of multiple ceiling fans that are connected on a single circuit or to a single "dumb" electric switch. The user may install many ceiling fans on a single circuit (or connected to a single "dumb" electric switch), without the need to install respectively multiple "dumb" switches, as they user may utilize the mobile application or the computerized dashboard in order to selectively open the Pairing Window or the Learning Window of a particular ceiling fan (and not other ceiling fans), thereby pairing one ceiling fan at a time without interference or clashes among ceiling fans and/or remote control units.

Some embodiments of the present invention, which operate with a multiple-address ceiling fan receiver, may solve or prevent or mitigate the problem of hidden information; by clearly displaying to the user a list of receiver addresses or Fan Addresses as programmed into the receiver or into the ceiling fan. Furthermore, such systems of the present invention may allow users to selectively manage individual Fan Addresses, by removing an address from memory, or adding a new address, or replacing values of addresses, or the like.

Some embodiments of the present invention may further connect the API associated with the Wi-Fi transceiver of the ceiling fan, with a Customer Service computerized dashboard; such that a customer service agent, located remotely from the venue of the ceiling fan, may be able to view (and in some embodiments, modify) the Fan Address information stored in the ceiling fan. In some embodiments, the Customer Service Agent is able to remotely and selectively trigger the re-opening of the Learning Window or Pairing Window of a specific ceiling fan's receiver. These features may be useful in live customer support situations.

In some embodiments, the mobile app may utilize such API in a set of Remote Management screens, enabling the user, for example: to view which transmitter addresses have already been programmed (paired); to view how many transmitter addresses this particular ceiling fan receiver can support; to reset the ceiling fan receiver to factory default address value(s); to manually modify or replace or overwrite the address(es) of a particular ceiling fan; to selectively initiate a re-pairing procedure (selective re-opening of a Learning Window or Pairing Window) of a particular ceiling fan; to utilize a step-by-step on-screen guided process or "wizard" which makes the process easy and efficient for the user; and/or to perform other operations on the user's mobile device or computer, in order to remotely and dynamically and selectively control, via a Wi-Fi communication message or signal, the operational settings and/or the configurational settings of a non-Wi-Fi receiver or a non-Wi-Fi transceiver (e.g., a Sub-1 Gigahertz receiver) of a particular ceiling fan (or other controlled appliance).

Some embodiments thus provide a ceiling fan Wi-Fi module, which enables the remote control management via an API and/or over a network; optionally supporting traditional DIP switch based pairing architectures, as well as Multiple-Address combination architectures; enabling Fan Address management via an API over a Wi-Fi communication link with the ceiling fan; enabling Fan Address management via a GUI, thereby solving or mitigating or preventing the Hidden Information problem, the safety problem, and/or the user convenience and efficiency problems); enabling Fan Address management which is visible to (and optionally, enabled to) a remotely located Customer Service Agent; solving problems associated with multiple ceiling fans (or multiple ceiling fan receivers) that are connected on the same electric circuit or that share the same single "dumb" electric switch; and/or providing other benefits or advantages.

Figure 1:
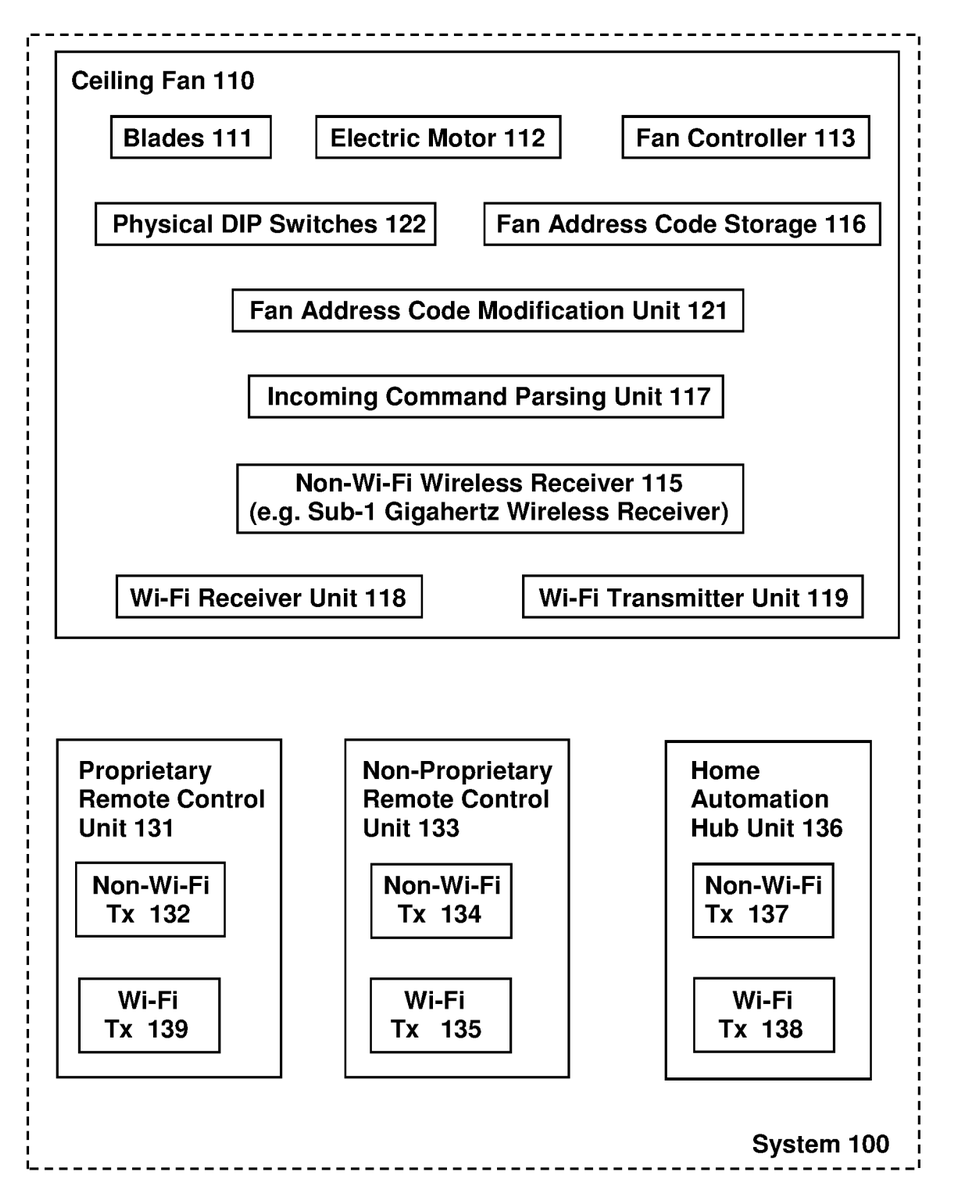
FIG. 1 is a schematic block-diagram illustration of a system, in accordance with some demonstrative embodiments of the present invention.

Reference is made to FIG. 1, which is a schematic block-diagram illustration of a system 100, in accordance with some demonstrative embodiments of the present invention. System 100 may comprise a Ceiling Fan 110, having a set of Blades 111 able to rotate or spun by an Electric Motor 112. A Fan Controller 113 (or an in-fan control unit) is also part of the Ceiling Fan 110, as an Integrated Circuit (IC) or a processor or a controller able to control and/or modify the operation or the operational properties of the ceiling fan (e.g., to start the blades rotation; to stop the blades rotation; to increase or decrease or modify the velocity of blades rotation; to switch among blades rotation patterns, such as a fixed rotational velocity, or a non-fixed rotation velocity which provides a "breeze" effect; to activate or to de-activate the electric motor; or the like).

Further located within or in the Ceiling Fan 110, is a Non-Wi-Fi wireless receiver 115, such as a Sub-1 Gigahertz wireless receiver. The Non-Wi-Fi wireless receiver 115 is able to receive non-Wi-Fi wireless communication signals, over a non-Wi-Fi communication link, from one or more non-Wi-Fi wireless transmitters. For example, system 100 may comprise a Proprietary Remote Control Unit 131, which comprises a Non-Wi-Fi Transmitter 132 (e.g., a Sub-1 Gigahertz transmitter) that is provided by a manufacturer of the Ceiling Fan 110, which may be a portable unit or may be mounted on a wall. Additionally or alternatively, system 100 may optionally comprise a Non-Proprietary Remote Control Unit 133, which may comprise a Non-Wi-Fi Transmitter 134 that may be provided by a third-party entity or by an after-market supplier, and/or may comprise a Wi-Fi Transmitter 135; or which may be part of a Home Automation system or sub-system; and which may be able to transmit similar or identical or duplicate or cloned non-Wi-Fi signals that are similarly received by the Non-Wi-Fi wireless receiver 115 of the Ceiling Fan 110; and/or which may be capable of transmitting and/or receiving Wi-Fi messages that may be exchanged with the ceiling fan 110 in accordance with the present invention (e.g., able to receive from the ceiling fan, over a Wi-Fi communication link, a Wi-Fi message which reports the current/existing values of Fan Address Code; able to transmit to the ceiling fan, over a Wi-Fi communication link, a Wi-Fi message indicating a request or a command or an instruction or a signal to replace or to modify or to update a value of a Fan Address Code stored in the ceiling fan, or to trigger commencement of the Training/Pairing/Learning time-window in the ceiling fan).

Optionally, the Non-Proprietary Remote Control Unit 133 may be controlled, directly or indirectly, by a Home Automation Hub Unit 136, which may communicate with the Non-Proprietary Remote Control Unit 133 over a local wireless communication link (e.g., Wi-Fi or Bluetooth or BLE), directly via a point-to-point local wireless communication link, or indirectly via a home Wi-Fi router or Wi-Fi access point, or indirectly via a cloud-computing server or via Internet connected links or network(s). Optionally, such Home Automation Hub Unit 136 may comprise, or may be associated with, a speech-to-text converter able to capture via an acoustic microphone audio or utterances or speech uttered by a user and able to convert it into commands that are acted upon; as well as a text-to-speech converter able to generate audible output in a natural language that the user may then hear via audio speakers. Optionally, the Home Automation Hub Unit 136 may comprise a Non-Wi-Fi Transmitter 137 (e.g., that may be provided by a third-party entity or by an after-market supplier, or by a home automation system provider, and not necessarily by the manufacturer of the ceiling fan) and/or may comprise a Wi-Fi Transmitter 138. The Home Automation Hub Unit 136 may be able to transmit similar or identical or duplicate or cloned non-Wi-Fi signals that are similarly received by the Non-Wi-Fi wireless receiver 115 of the Ceiling Fan 110; and/or may be capable of transmitting and/or receiving Wi-Fi messages that may be exchanged with the ceiling fan 110 in accordance with the present invention (e.g., able to receive from the ceiling fan, over a Wi-Fi communication link, a Wi-Fi message which reports the current/existing values of Fan Address Code; able to transmit to the ceiling fan, over a Wi-Fi communication link, a Wi-Fi message indicating a request or a command or an instruction or a signal to replace or to modify or to update a value of a Fan Address Code stored in the ceiling fan, or to trigger commencement of the Training/Pairing/Learning time-window in the ceiling fan).

In some embodiments, optionally, the Non-Proprietary Remote Control Unit 133 may be implemented as (or using) a portable electronic device, such as a smartphone or tablet or smart-watch, which is configured or adapted to generate and to wirelessly transmit the wireless signals that are then received by the Ceiling Fan 110, particularly by its Non-Wi-Fi Wireless Receiver 115.

In some embodiments, optionally, the Proprietary Remote Control Unit 131 may be augmented or expanded or upgraded or modified, to further comprise a Wi-Fi Transmitter 139; in order to provide the Proprietary Remote Control Unit 131 the capabilities for transmitting and/or receiving Wi-Fi messages that may be exchanged with the ceiling fan 110 in accordance with the present invention (e.g., such that the Proprietary Remote Control Unit 131 would be able to receive from the ceiling fan, over a Wi-Fi communication link, a Wi-Fi message which reports the current/existing values of Fan Address Code; would able to transmit to the ceiling fan, over a Wi-Fi communication link, a Wi-Fi message indicating a request or a command or an instruction or a signal to replace or to modify or to update a value of a Fan Address Code stored in the ceiling fan, or to trigger commencement of the Training/Pairing/Learning time-window in the ceiling fan).

In accordance with the present invention, the Non-Wi-Fi Wireless Receiver 115 of the Ceiling Fan 110 (e.g., the Sub-1 Gigahertz (RF) receiver unit of the Ceiling Fan 115), receives an incoming Non-Wi-Fi wireless signal (e.g., a Sub-1 Gigahertz RF signal) which carries a non-Wi-Fi command (e.g., carries a Sub-1 Gigahertz command), that was wirelessly transmitted over a non-Wi-Fi communication link (e.g., over a Sub-1 Gigahertz communication link) by one of the non-Wi-Fi transmitter units of system 100, such as by a remote control device.

In some embodiments, the non-Wi-Fi command or signal, or the Sub-1 Gigahertz command or signal, is at least one of: a non-Wi-Fi command or a Sub-1 Gigahertz command to turn off the electric motor; a non-Wi-Fi command or a Sub-1 Gigahertz command to turn on the electric motor; a non-Wi-Fi command or a Sub-1 Gigahertz command to modify a rotation speed of the electric motor; a non-Wi-Fi command or a Sub-1 Gigahertz command to modify or to switch a rotation pattern of the blades or the electric motor (e.g., fixed velocity; breeze effect); or the like.

Ceiling Fan 110 further comprises a Fan Address Code Storage Unit 116, which stores locally within said ceiling fan a Fan Address Codes or a Fan Address Value that identifies said ceiling fan uniquely (or at least partially uniquely) relative to other ceiling fans.

Ceiling Fan 110 further comprises an Incoming Command Parsing Unit 117, to parse the incoming non-Wi-Fi command (or the incoming Sub-1 Gigahertz command or signal), and to provide the operational command to the fan controller only if the incoming command indicates the particular fan address code that is stored in the Fan Address Code Storage Unit, or indicates one of such stored fan address codes.

Ceiling Fan 110 further comprises a Wi-Fi receiver unit 118, co-located with the non-Wi-Fi receiver 115 or the Sub-1 Gigahertz receiver unit of the Ceiling Fan 110, to receive an incoming Wi-Fi signal from an electronic device; wherein said Wi-Fi signal carries, for example, (I) an instruction to modify or replace or overwrite the particular fan address code that is stored in the Fan Address Code Storage Unit of said ceiling fan, and (II) a replacement fan address code. In some embodiments, the incoming Wi-Fi signal only provides the replacement value of the Fan Address Code, without an instruction to replace or to overwrite, and such instruction may be implied or otherwise derived from a structure or format of the Wi-Fi signal or command. In some embodiments, the Wi-Fi signal or command is to replace or to overwrite or to modify a next-available Fan Address Code (e.g., if several such codes are stored locally in the Fan Address Code Storage Unit 116, or a currently utilized Fan Address Code.

Ceiling Fan 110 further comprises a Fan Address Code Modification Unit 121, to parse the incoming Wi-Fi signal or Wi-Fi message, and to replace, in the Fan Address Code Storage Unit, (i) the particular fan address code with (ii) the replacement fan address code; or to otherwise modify or reset or over-write or update one or more of the stored Fan Address Code(s) in the Fan Address Code Storage Unit 116.

In some embodiments, the Wi-Fi receiver unit 118 of the Ceiling Fan 110, which is co-located with the Sub-1 Gigahertz receiver unit or with the non-Wi-Fi receiver of the ceiling fan, enables modification via a Wi-Fi message of one or more operational parameters and/or configurational parameters (e.g., Fan Address codes or values) that are utilized by the non-Wi-Fi receiver (e.g., by the Sub-1 Gigahertz receiver) of the ceiling fan to receive only Sub-1 Gigahertz commands (or other non-Wi-Fi wireless commands) that are directed to this specific ceiling fan and to ignore other Sub-1 Gigahertz commands (or other non-Wi-Fi wireless commands) that are intended or directed to other ceiling fans.

In some embodiments, the Wi-Fi receiver unit 118, which is co-located in the ceiling fan 110 with the Sub-1 Gigahertz receiver unit (or another type of non-Wi-Fi receiver unit within the ceiling fan), enables dynamic configuration of one or more properties of the non-Wi-Fi wireless receiver 115 (e.g., the Sub-1 Gigahertz receiver of the ceiling fan 110) via a configuration message transmitted over a Wi-Fi communication link.

In some embodiments, the Fan Address Code Modification Unit 121 utilizes and enforces the replacement fan address(es), even if a set of physical DIP switches 122 (which may optionally be part of the ceiling fan 110) indicates a different value of a fan address code. Optionally, an Over-Riding Controller Unit 123 may operate to ensure, that if the set of physical DIP switches 122 indicate a first value of Fan Address Code, and the Fan Address Code Storage Unit 116 stores or indicates a second, different, value of Fan Address Code, then the Fan Address Code (or codes) that is (or are) stored in the Fan Address Code Storage Unit 116 prevail and govern over the code indicated by the physical DIP switches 122.

In some embodiments, the Wi-Fi receiver unit 118, which is co-located with or next to the Sub-1 Gigahertz receiver unit (or other non-Wi-Fi receiver unit 115 of the ceiling fan 110), enables dynamic replacement (or dynamic over-writing) via a Wi-Fi message, of an original (e.g., factory-assigned, or user-defined) fan address code of said ceiling fan 110, that was originally set via a physical DIP switch of the ceiling fan or via a set of physical DIP switches of the ceiling fan 110.

In some embodiments, Ceiling Fan 110 further comprises a Wi-Fi transmitter unit 119, located in or within the ceiling fan 110, to wirelessly transmit over a Wi-Fi communication link, to an electronic device that is external to the ceiling fan 110, an outgoing Wi-Fi message indicating current value(s) of the fan address code(s) of that ceiling fan that is (or that are) utilized by the non-Wi-Fi receiver unit 115 (e.g., the Sub-1 Gigahertz receiver unit) of that ceiling fan 110.

In some embodiments, the Wi-Fi Transmitter Unit 119 of the ceiling fan 110 is to wirelessly transmit over a Wi-Fi communication link, to the external electronic device, an outgoing Wi-Fi message indicating a current value (or several current values) of the fan address code(s) of the ceiling code (or of the Sub-1 Gigahertz receiver, or of the non-Wi-Fi receiver unit 115), to enable such electronic device (or another electronic device that is associate with it or that is capable of commanding it or being in communication with it) to initiate a modification or a replacement or an overwriting of the current value(s) of the fan address code(s) of that ceiling fan 115 via a Wi-Fi message that is transmitted to and is directed to the Wi-Fi receiver unit 119 of that ceiling fan 115.

In some embodiments, the Wi-Fi receiver unit 119 of ceiling fan 110 is configured to receive an incoming Wi-Fi message carrying a command to start a time-constrained learning window or pairing window, in which the non-Wi-Fi receiver unit (e.g., the Sub-1 Gigahertz receiver unit) operates to receive an incoming non-Wi-Fi pairing signal or learning signal (e.g., an incoming Sub-1 Gigahertz learning signal or pairing signal) indicating a new fan address code transmitted over a non-Wi-Fi communication link (e.g., transmitted over a Sub-1 Gigahertz communication link).

In some embodiments, the Fan Address Code Modification Unit 121 utilizes and enforces the replacement fan address code(s), even if a set of physical SIP switches of the ceiling fan 110 indicates a different value of a fan address code.

In some embodiments, one or more operational properties and/or configurational properties of the non-Wi-Fi receiver unit 115 of the ceiling fan 110 (e.g., of the Sub-1 Gigahertz receiver unit of the ceiling fan 110), are dynamically configured within the ceiling fan 110, based on an incoming Wi-Fi configuration message that is transmitted to the Wi-Fi receiver unit 118 of the ceiling fan 110 over a Wi-Fi communication link, from an electronic device or a home automation device or hub that is external to the ceiling fan and that utilizes a Wi-Fi transmitter to transmit such Wi-Fi message which is then utilized within the ceiling fan to configure or modify operational or configurational settings associated with the Sub-1 Gigahertz receiver unit or the non-Wi-Fi receiver unit of the ceiling fan 110.

In some embodiments, the Wi-Fi receiver unit 118 of the ceiling fan 110 is to receive, over a Wi-Fi communication link, a particular incoming Wi-Fi message, that selectively triggers an opening of a non-Wi-Fi pairing (or leaning) time-constrained time-window or of a Sub-1 GHz pairing time-window for this specific ceiling fan, and does not trigger an opening of a pairing (or learning) time-constrained time-window or of a Sub-1 GHz pairing time-window for other or nearby or neighboring ceiling fans.

In some embodiments, the Wi-Fi receiver unit 118 of the ceiling fan 110 is to receive, over a Wi-Fi communication link, a particular incoming Wi-Fi message, that selectively triggers an opening of a non-Wi-Fi pairing time-window for said particular ceiling fan and does not trigger an opening of a non-Wi-Fi pairing time-window for other or nearby or neighboring ceiling fans.

In some embodiments, the Wi-Fi transmitter unit 119 of the Ceiling fan is to wirelessly transmit over a Wi-Fi communication link, to an electronic device that is external to the ceiling fan 110, an outgoing Wi-Fi message indicating a current value of the fan address code (or, the current values of several such address codes) of said ceiling fan 110 that is (or are) currently utilized by the non-Wi-Fi receiver (e.g., by the Sub-1 Gigahertz receiver) of that ceiling fan 110. In some embodiments, the Wi-Fi receiver unit 118 of the ceiling fan 110 is to receive, over a Wi-Fi communication link, an incoming Wi-Fi message carrying an incoming command to modify or replace or update the fan address code (or several such fan address codes) of said particular ceiling fan that is (or are) utilized by the Sub-1 Gigahertz receiver unit (or by the non-Wi-Fi wireless receiver unit) of that ceiling fan.

In some embodiments, the Wi-Fi transmitter unit 119 of the ceiling fan 110, is to wirelessly transmit over a Wi-Fi communication link, to a cloud-based server or to a home automation hub, an outgoing message indicating the current value(s) of the fan address code(s) of that particular ceiling fan, that is (or are) utilized by the Sub-1 Gigahertz receiver unit (or by a non-Wi-Fi wireless receiver unit) of that ceiling fan 110.

In some embodiments, the Wi-Fi transmitter unit 119 of the ceiling fan 110 is to wirelessly transmit over a Wi-Fi communication link, to a cloud-based server or to a home automation hub, an outgoing message indicating the current value(s) of the fan address code(s) of the ceiling fan that is (or are) utilized by the Sub-1 Gigahertz receiver unit (or the other non-Wi-Fi wireless receiver unit) of that ceiling fan; and the Wi-Fi receiver unit 118 of the ceiling fan 110 is to receive, over a Wi-Fi communication link, an incoming Wi-Fi message carrying an incoming command to modify or replace or update or overwrite one or more of the fan address code(s) that are stored within that ceiling fan and that is (or are) utilized by the Sub-1 Gigahertz receiver unit (or by the other non-Wi-Fi receiver unit) of that ceiling fan to pair between that specific Sub-1 GHz/non-Wi-Fi receiver unit and one or more transmitters (e.g., Sub-1 GHz transmitter or non-Wi-Fi transmitter) that are external to that ceiling fan 110.

In some embodiments, the Wi-Fi transmitter unit 110 of the ceiling fan 110 is to wirelessly transmit over a Wi-Fi communication link, to a cloud-based server or to a home automation hub, an outgoing message indicating current value(s) of the fan address code(s) of that particular ceiling fan that is (or are) utilized by the Sub-1 Gigahertz receiver unit (or by the non-Wi-Fi wireless receiver) of that particular ceiling fan; wherein the Wi-Fi receiver unit 118 of that ceiling fan 110 is to receive, over a Wi-Fi communication link, an incoming Wi-Fi message which originates from a customer support terminal that is associated with said cloud-based server or with said home automation hub, wherein said incoming Wi-Fi message is carrying an incoming command to open or to initiate or to trigger a time-constrained pairing/learning time-window of the non-Wi-Fi receiver (e.g., the Sub-1 Gigahertz receiver unit) of that particular ceiling fan; wherein the Sub-1 Gigahertz receiver (or the non-Wi-Fi receiver unit) of the ceiling fan 110, in response to said incoming Wi-Fi message which originates from the customer support terminal, is to open or start or initiate the time-constrained pairing/learning time-window of that Sub-1 Gigahertz receiver unit (or the non-Wi-Fi receiver unit) of that particular ceiling fan.

In some embodiments, the Wi-Fi transmitter unit 119 of the ceiling fan 110, is to send over a Wi-Fi communication link an outgoing message indicating current value(s) of one or more operational parameters and/or configurational parameters of the Sub-1 Gigahertz receiver unit (or, the non-Wi-Fi receiver unit) of that particular ceiling fan 110; such as, the particular Fan Address Code(s) that is (or are) utilized by this particular ceiling fan 110.

In some embodiments, the Wi-Fi transmitter unit 119 in said ceiling fan 110 is to send over a Wi-Fi communication link an outgoing message indicating a current value of a configurational parameter of the Sub-1 Gigahertz receiver unit (or the non-Wi-Fi wireless receiver) of that particular ceiling fan 110; wherein the Wi-Fi transmitter unit 119 of the ceiling fan 110, and the Wi-Fi receiver unit 118 of the ceiling fan 110, enable a remote electronic device (that is external to the ceiling fan 110) to dynamically modify or update or replace or overwrite, via one or more Wi-Fi communication messages, those configurational parameters of the Sub-1 Gigahertz receiver unit (or of the non-Wi-Fi wireless receiver unit) of that particular ceiling fan, and particularly to update or replace or add or delete or modify one or more Fan Address Code value(s) that are utilized to identify this particular ceiling fan and/or to distinguish it from other or nearby or neighboring ceiling fans or appliances.

In some embodiments, the Wi-Fi transmitter unit 119 in the ceiling fan 110, is to send over a Wi-Fi communication link an outgoing message indicating a current Fan Address Value of the Sub-1 Gigahertz receiver unit (or of the non-Wi-Fi receiver unit) of that ceiling fan 110; wherein the Wi-Fi transmitter unit 119 of the ceiling fan 110, and the Wi-Fi receiver unit 118 of the ceiling fan 110, enable a remote electronic device to dynamically modify, via one or more Wi-Fi communication messages, the Fan Address Value(s) of the Sub-1 Gigahertz receiver unit (or of the non-Wi-Fi receiver) of said ceiling fan 110.

Some embodiments include a ceiling fan comprising: (a) rotatable blades; (b) an electric motor to rotate said rotatable blades; (c) a fan controller, to control activation and deactivation and rotation speed of said electric motor; (d) a Sub-1 Gigahertz wireless receiver unit, to receive an incoming Sub-1 Gigahertz wireless signal which carries a Sub-1 Gigahertz command that was wirelessly transmitted over a Sub-1 Gigahertz communication link by a remote control device and is directed to said fan controller of the ceiling fan; wherein said Sub-1 Gigahertz command is at least one of: a Sub-1 Gigahertz command to turn off said electric motor, a Sub-1 Gigahertz command to turn on said electric motor, a Sub-1 Gigahertz command to modify a rotation speed of said electric motor; (e) a Fan Address Code Storage Unit, which is internal to said ceiling fan, to store within said ceiling fan an address code that identifies said ceiling fan relative to other ceiling fans; (f) an Incoming Command Parsing Unit, to parse the incoming Sub-1 Gigahertz command, and to provide a respective command signal to said fan controller only if said incoming Sub-1 Gigahertz command indicates said particular fan address code that is stored in said Fan Address Code Storage Unit; (g) a Wi-Fi receiver unit, co-located with said Sub-1 Gigahertz receiver unit, to receive an incoming Wi-Fi signal from an electronic device that is external to said ceiling fan; wherein said incoming Wi-Fi signal carries at least a replacement fan address code that is intended for replacement of an existing fan address code in the Fan Address Code Storage Unit of said ceiling fan; (h) a Fan Address Code Modification Unit, to parse said incoming Wi-Fi signal, and to replace, in said Fan Address Code Storage Unit of the ceiling fan, (i) said exiting fan address code with (ii) said replacement fan address code.

Some embodiments comprise a kit, or an upgrade kit, which includes only some (but not necessarily all) of the above-mentioned components, for upgrading or enhancing or improving a ceiling fan (or other appliance of device); such as, by replacing original receiver unit(s) and/or transmitter unit(s) of a conventional ceiling fan, with replacement enhanced modules or units as described above, and/or by adding new components to such conventional ceiling fan.

In some embodiments, the Wi-Fi receiver unit of the ceiling fan, which is co-located with the Sub-1 Gigahertz receiver unit, receives said incoming Wi-Fi message and triggers modification or replacement of one or more operational parameters that are utilized by the Sub-1 Gigahertz receiver of the ceiling fan for receiving only incoming Sub-1 Gigahertz commands that are directed to said ceiling fan and for ignoring or discarding incoming Sub-1 Gigahertz commands that are intended to be received by other ceiling fans.

In some embodiments, the Wi-Fi receiver unit of the ceiling fan, which is co-located with the Sub-1 Gigahertz receiver unit, enables dynamic configuration of one or more parameters of the Sub-1 Gigahertz receiver of the ceiling fan via a configuration message transmitted to said ceiling fan over a Wi-Fi communication link.

In some embodiments, the Fan Address Code Modification Unit utilizes and enforces said replacement fan address, even if a set of physical Dual In-line Package (DIP) switches of said ceiling fan indicates a different value of fan address code for said ceiling fan.

In some embodiments, the Wi-Fi receiver unit of the ceiling fan, which is co-located with the Sub-1 Gigahertz receiver unit, enables via the incoming Wi-Fi message that is received from a Wi-Fi transmitter that is external to said ceiling fan, modification of an existing fan address code of said ceiling fan that was previously set via a set of physical DIP switches of said ceiling fan.

In some embodiments, the ceiling fan further comprises a Wi-Fi transmitter unit, to wirelessly transmit over a Wi-Fi communication link, to said electronic device that is external to said ceiling fan, an outgoing Wi-Fi reporting message that reports a current value of the fan address code of said ceiling fan that is utilized by the Sub-1 Gigahertz receiver unit of said ceiling fan.

In some embodiments, the ceiling fan further comprises a Wi-Fi transmitter unit, to wirelessly transmit over a Wi-Fi communication link, to said electronic device that is external to said ceiling fan, an outgoing Wi-Fi reporting message (i) that indicates a current value of the fan address code of said ceiling fan, and (ii) that enables said electronic device to initiate a Wi-Fi based modification process of the current value of the fan address code of said ceiling fan via a Wi-Fi message directed to the Wi-Fi receiver unit of said ceiling fan.

In some embodiments, the Wi-Fi receiver unit of the ceiling fan is configured to receive an incoming Wi-Fi message which represents a command to start a time-constrained Learning Window in which said Sub-1 Gigahertz receiver unit of the ceiling fan operates to receive an incoming Sub-1 Gigahertz learning signal indicating a new value of the fan address code that is transmitted over a Sub-1 Gigahertz communication link by an electronic device that is external to said ceiling fan.

In some embodiments, the Fan Address Code Modification Unit utilizes and enforces said replacement fan address that was received by the Wi-Fi receiver unit of the ceiling fan over a Wi-Fi communication link, even if a set of physical Dual In-line Package (DIP) switches of said ceiling fan indicates a different value of fan address code for said ceiling fan.

In some embodiments, one or more operational parameters of the Sub-1 Gigahertz receiver unit of the ceiling fan are dynamically modified within the ceiling fan, based on an incoming Wi-Fi configuration message that is transmitted to the Wi-Fi receiver unit of said ceiling fan by over a Wi-Fi communication link.

In some embodiments, the Wi-Fi receiver unit of said ceiling fan is to receive, over a Wi-Fi communication link, from a Wi-Fi transmitter of an electronic device that is external to said ceiling fan, a particular incoming Wi-Fi message that selectively triggers opening of a pairing time-window for said ceiling fan and does not trigger opening of a pairing time-window for other ceiling fans.

In some embodiments, the ceiling fan further comprises a Wi-Fi transmitter unit, to wirelessly transmit over a Wi-Fi communication link, to said electronic device that is external to said ceiling fan, an outgoing Wi-Fi message reporting a current value of the fan address code of said ceiling fan that is utilized by the Sub-1 Gigahertz receiver unit of said ceiling fan; wherein the Wi-Fi receiver unit of said ceiling fan is to receive, over a Wi-Fi communication link, an incoming Wi-Fi message from said electronic device that is external to said ceiling fan, carrying an incoming command to modify the fan address code of said ceiling fan that is utilized by the Sub-1 Gigahertz receiver unit of said ceiling fan.

In some embodiments, the ceiling fan further comprises a Wi-Fi transmitter unit in said ceiling fan, to wirelessly transmit over a Wi-Fi communication link, from said ceiling fan to a cloud-based server, an outgoing message reporting to said cloud-based server a current value of the fan address code of said ceiling fan that is utilized by the Sub-1 Gigahertz receiver unit of said ceiling fan.

In some embodiments, the ceiling fan further comprises a Wi-Fi transmitter unit in said ceiling fan, to wirelessly transmit over a Wi-Fi communication link, from said ceiling fan to a cloud-based server, an outgoing message reporting to said cloud-based server a current value of the fan address code of said ceiling fan that is utilized by the Sub-1 Gigahertz receiver unit of said ceiling fan; wherein the Wi-Fi receiver unit of said ceiling fan is to receive, over said Wi-Fi communication link, an incoming Wi-Fi message carrying an incoming command to modify the fan address code of said ceiling fan that is utilized by the Sub-1 Gigahertz receiver unit of said ceiling fan.

In some embodiments, the ceiling fan further comprises a Wi-Fi transmitter unit, to wirelessly transmit over a Wi-Fi communication link, to a cloud-based server, an outgoing message indicating a current value of the fan address code of said ceiling fan that is utilized by the Sub-1 Gigahertz receiver unit of said ceiling fan; wherein the Wi-Fi receiver unit of said ceiling fan is to receive, over a Wi-Fi communication link, an incoming Wi-Fi message which originates from a customer support terminal that is associated with said cloud-based server, wherein said incoming Wi-Fi message is carrying an incoming command to open a time-constrained pairing time-window of said Sub-1 Gigahertz receiver unit of said ceiling fan; wherein said Sub-1 Gigahertz receiver of the ceiling fan, in response to said incoming Wi-Fi message which originates from said customer support terminal, is to open said time-constrained pairing time-window of said Sub-1 Gigahertz receiver unit of said ceiling fan.

In some embodiments, the ceiling fan further comprises a Wi-Fi transmitter unit, to send over a Wi-Fi communication link an outgoing message reporting a current value of a configuration-related parameter of the Sub-1 Gigahertz receiver unit of said ceiling fan.

In some embodiments, the ceiling fan further comprises a Wi-Fi transmitter unit, to send over a Wi-Fi communication link an outgoing message reporting a current value of a configuration-related parameter of the Sub-1 Gigahertz receiver unit of said ceiling fan; wherein said Wi-Fi transmitter unit of the ceiling fan, and said Wi-Fi receiver unit of the ceiling fan, enable a remote electronic device to dynamically modify or replace, via one or more Wi-Fi communication messages, the current value of said configuration-related parameter of the Sub-1 Gigahertz receiver unit of said ceiling fan.

In some embodiments, the ceiling fan further comprises a Wi-Fi transmitter unit, to send over a Wi-Fi communication link an outgoing message reporting a current value of a Fan Address Code of the Sub-1 Gigahertz receiver unit of said ceiling fan; wherein said Wi-Fi transmitter unit of the ceiling fan, and said Wi-Fi receiver unit of the ceiling fan, enable a remote electronic device to dynamically modify or replace, via one or more Wi-Fi communication messages, the current value of said Fan Address Code of the Sub-1 Gigahertz receiver unit of said ceiling fan.

In some embodiments, a ceiling fan comprises: (a) rotatable blades; (b) an electric motor to rotate said rotatable blades; (c) a fan controller, to control activation and deactivation and rotation speed of said electric motor; (d) a non-Wi-Fi wireless receiver unit, to receive incoming non-Wi-Fi signals indicating control commands to said ceiling fan which is associated with an existing Fan Address Code; (e) a Wi-Fi wireless receiver unit, to receive an incoming Wi-Fi message indicating a replacement Fan Address Code; (f) a Fan Address Code Modification Unit, to replace (I) said existing Fan Access Code of said ceiling fan, with (II) said replacement Fan Access Code that was received via said incoming Wi-Fi message.

In some embodiments, a method comprises: (a) at a non-Wi-Fi wireless receiver unit of a ceiling fan, receiving incoming non-Wi-Fi signals indicating control commands to said ceiling fan which is associated with an existing Fan Address Code; (b) at a Wi-Fi wireless receiver unit of said ceiling fan, receiving an incoming Wi-Fi message indicating a replacement Fan Address Code; (c) at a Fan Address Code Modification Unit of said ceiling fan, replacing (I) said existing Fan Access Code of said ceiling fan, with (II) said replacement Fan Access Code that was received via said incoming Wi-Fi message.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A ceiling fan comprising:
(a) rotatable blades;
(b) an electric motor to rotate said rotatable blades;
(c) a fan controller, to control activation and deactivation and rotation speed of said electric motor;
(d) a Sub-1 Gigahertz wireless receiver unit, to receive an incoming Sub-1 Gigahertz wireless signal which carries an incoming Sub-1 Gigahertz command that was wirelessly transmitted over a Sub-1 Gigahertz communication link by a remote control device and is directed to said fan controller of the ceiling fan,
wherein said incoming Sub-1 Gigahertz command is at least one of: a Sub-1 Gigahertz command to turn off said electric motor, a Sub-1 Gigahertz command to turn on said electric motor, a Sub-1 Gigahertz command to modify a rotation speed of said electric motor;
(e) a Fan Address Code Storage Unit, which is internal to said ceiling fan, to store within said ceiling fan an address code that identifies said ceiling fan relative to other ceiling fans;
(f) an Incoming Command Parsing Unit, to parse the incoming Sub-1 Gigahertz command, and to provide a respective command signal to said fan controller only if said incoming Sub-1 Gigahertz command indicates said particular fan address code that is stored in said Fan Address Code Storage Unit;
(g) a Wi-Fi receiver unit, co-located with said Sub-1 Gigahertz receiver unit, to receive an incoming Wi-Fi signal from an electronic device that is external to said ceiling fan,
wherein said incoming Wi-Fi signal carries at least a replacement fan address code that is intended for replacement of an existing fan address code in the Fan Address Code Storage Unit of said ceiling fan;

(h) a Fan Address Code Modification Unit, to parse said incoming Wi-Fi signal, and to replace, in said Fan Address Code Storage Unit of the ceiling fan, (i) said exiting fan address code with (ii) said replacement fan address code.

2. The ceiling fan of claim 1,
wherein the Wi-Fi receiver unit of the ceiling fan, which is co-located with the Sub-1 Gigahertz receiver unit, receives said incoming Wi-Fi message and triggers modification or replacement of one or more operational parameters that are utilized by the Sub-1 Gigahertz receiver of the ceiling fan for receiving only incoming Sub-1 Gigahertz commands that are directed to said ceiling fan and for ignoring or discarding incoming Sub-1 Gigahertz commands that are intended to be received by other ceiling fans.

3. The ceiling fan of claim 1,
wherein the Wi-Fi receiver unit of the ceiling fan, which is co-located with the Sub-1 Gigahertz receiver unit, enables dynamic configuration of one or more parameters of the Sub-1 Gigahertz receiver of the ceiling fan via a configuration message transmitted to said ceiling fan over a Wi-Fi communication link.

4. The ceiling fan of claim 1,
wherein the Fan Address Code Modification Unit utilizes and enforces said replacement fan address, even if a set of physical Dual In-line Package (DIP) switches of said ceiling fan indicates a different value of fan address code for said ceiling fan.

5. The ceiling fan of claim 1,
wherein the Wi-Fi receiver unit of the ceiling fan, which is co-located with the Sub-1 Gigahertz receiver unit, enables via the incoming Wi-Fi message that is received from a Wi-Fi transmitter that is external to said ceiling fan, modification of an existing fan address code of said ceiling fan that was previously set via a set of physical DIP switches of said ceiling fan.

6. The ceiling fan of claim 1,
wherein the ceiling fan further comprises a Wi-Fi transmitter unit, to wirelessly transmit over a Wi-Fi communication link, to said electronic device that is external to said ceiling fan, an outgoing Wi-Fi reporting message that reports a current value of the fan address code of said ceiling fan that is utilized by the Sub-1 Gigahertz receiver unit of said ceiling fan.

7. The ceiling fan of claim 1,
wherein the ceiling fan further comprises a Wi-Fi transmitter unit,
to wirelessly transmit over a Wi-Fi communication link, to said electronic device that is external to said ceiling fan, an outgoing Wi-Fi reporting message (i) that indicates a current value of the fan address code of said ceiling fan, and (ii) that enables said electronic device to initiate a Wi-Fi based modification process of the current value of the fan address code of said ceiling fan via a Wi-Fi message directed to the Wi-Fi receiver unit of said ceiling fan.

8. The ceiling fan of claim 1,
wherein the Wi-Fi receiver unit of the ceiling fan is configured to receive an incoming Wi-Fi message which represents a command to start a time-constrained Learning Window in which said Sub-1 Gigahertz receiver unit of the ceiling fan operates to receive an incoming Sub-1 Gigahertz learning signal indicating a new value of the fan address code that is transmitted over the Sub-1 Gigahertz communication link by the electronic device that is external to said ceiling fan.

9. The ceiling fan of claim 1,
wherein the Fan Address Code Modification Unit utilizes and enforces said replacement fan address that was received by the Wi-Fi receiver unit of the ceiling fan over a Wi-Fi communication link, even if a set of physical Dual In-line Package (DIP) switches of said ceiling fan indicates a different value of fan address code for said ceiling fan.

10. The ceiling fan of claim 1,
wherein one or more operational parameters of the Sub-1 Gigahertz receiver unit of the ceiling fan are dynamically modified within the ceiling fan, based on an incoming Wi-Fi configuration message that is transmitted to the Wi-Fi receiver unit of said ceiling fan over a Wi-Fi communication link.

11. The ceiling fan of claim 1,
wherein the Wi-Fi receiver unit of said ceiling fan is to receive, over a Wi-Fi communication link, from a Wi-Fi transmitter of said electronic device that is external to said ceiling fan, a particular incoming Wi-Fi message that selectively triggers opening of a pairing time-window for said ceiling fan and does not trigger opening of a pairing time-window for other ceiling fans.

12. The ceiling fan of claim 1,
wherein the ceiling fan further comprises a Wi-Fi transmitter unit,
to wirelessly transmit over a Wi-Fi communication link, to said electronic device that is external to said ceiling fan, an outgoing Wi-Fi message reporting a current value of the fan address code of said ceiling fan that is utilized by the Sub-1 Gigahertz receiver unit of said ceiling fan;
wherein the Wi-Fi receiver unit of said ceiling fan is to receive, over a Wi-Fi communication link, an incoming Wi-Fi message from said electronic device that is external to said ceiling fan, carrying an incoming command to modify the fan address code of said ceiling fan that is utilized by the Sub-1 Gigahertz receiver unit of said ceiling fan.

13. The ceiling fan of claim 1,
further comprising a Wi-Fi transmitter unit in said ceiling fan,
to wirelessly transmit over a Wi-Fi communication link, from said ceiling fan to a cloud-based server, an outgoing message reporting to said cloud-based server a current value of the fan address code of said ceiling fan that is utilized by the Sub-1 Gigahertz receiver unit of said ceiling fan.

14. The ceiling fan of claim 1,
further comprising a Wi-Fi transmitter unit in said ceiling fan,
to wirelessly transmit over a Wi-Fi communication link, from said ceiling fan to a cloud-based server, an outgoing message reporting to said cloud-based server a current value of the fan address code of said ceiling fan that is utilized by the Sub-1 Gigahertz receiver unit of said ceiling fan;
wherein the Wi-Fi receiver unit of said ceiling fan is to receive, over said Wi-Fi communication link, an incoming Wi-Fi message carrying an incoming command to modify the fan address code of said ceiling fan that is utilized by the Sub-1 Gigahertz receiver unit of said ceiling fan.

15. The ceiling fan of claim 1,
wherein the ceiling fan further comprises a Wi-Fi transmitter unit, to wirelessly transmit over a Wi-Fi communication link, to a cloud-based server, an outgoing message indicating a current value of the fan address code of said ceiling fan that is utilized by the Sub-1 Gigahertz receiver unit of said ceiling fan;

wherein the Wi-Fi receiver unit of said ceiling fan is to receive, over said Wi-Fi communication link, an incoming Wi-Fi message which originates from a customer support terminal that is associated with said cloud-based server, wherein said incoming Wi-Fi message is carrying an incoming command to open a time-constrained pairing time-window of said Sub-1 Gigahertz receiver unit of said ceiling fan;

wherein said Sub-1 Gigahertz receiver of the ceiling fan, in response to said incoming Wi-Fi message which originates from said customer support terminal, is to open said time-constrained pairing time-window of said Sub-1 Gigahertz receiver unit of said ceiling fan.

16. The ceiling fan of claim 1, wherein the ceiling fan further comprises a Wi-Fi transmitter unit, to send over a Wi-Fi communication link an outgoing message reporting a current value of a configuration-related parameter of the Sub-1 Gigahertz receiver unit of said ceiling fan.

17. The ceiling fan of claim 1, wherein the ceiling fan further comprises a Wi-Fi transmitter unit, to send over a Wi-Fi communication link an outgoing message reporting a current value of a configuration-related parameter of the Sub-1 Gigahertz receiver unit of said ceiling fan;

wherein said Wi-Fi transmitter unit of the ceiling fan, and said Wi-Fi receiver unit of the ceiling fan, enable said electronic device to dynamically modify or replace, via one or more Wi-Fi communication messages, the current value of said configuration-related parameter of the Sub-1 Gigahertz receiver unit of said ceiling fan.

18. The ceiling fan of claim 1, wherein the ceiling fan further comprises a Wi-Fi transmitter unit, to send over a Wi-Fi communication link an outgoing message reporting a current value of a Fan Address Code of the Sub-1 Gigahertz receiver unit of said ceiling fan;

wherein said Wi-Fi transmitter unit of the ceiling fan, and said Wi-Fi receiver unit of the ceiling fan, enable said electronic device to dynamically modify or replace, via one or more Wi-Fi communication messages, the current value of said Fan Address Code of the Sub-1 Gigahertz receiver unit of said ceiling fan.

19. A ceiling fan comprising:

(a) rotatable blades;

(b) an electric motor to rotate said rotatable blades;

(c) a fan controller, to control activation and deactivation and rotation speed of said electric motor;

(d) a non-Wi-Fi wireless receiver unit, to receive incoming non-Wi-Fi signals indicating control commands to said ceiling fan which is associated with an existing Fan Address Code;

(e) a Wi-Fi wireless receiver unit, to receive an incoming Wi-Fi message indicating a replacement Fan Address Code;

(f) a Fan Address Code Modification Unit, to replace (I) said existing Fan Access Code of said ceiling fan, with (II) said replacement Fan Access Code that was received via said incoming Wi-Fi message.

20. A method comprising:

(a) at a non-Wi-Fi wireless receiver unit of a ceiling fan, receiving incoming non-Wi-Fi signals indicating control commands to said ceiling fan which is associated with an existing Fan Address Code;

(b) at a Wi-Fi wireless receiver unit of said ceiling fan, receiving an incoming Wi-Fi message indicating a replacement Fan Address Code;

(c) at a Fan Address Code Modification Unit of said ceiling fan, replacing (I) said existing Fan Access Code of said ceiling fan, with (II) said replacement Fan Access Code that was received via said incoming Wi-Fi message.

* * * * *